(12) United States Patent
Jensen et al.

(10) Patent No.: US 7,933,055 B2
(45) Date of Patent: Apr. 26, 2011

(54) LASER SCANNER

(75) Inventors: Thomas Jensen, Rorschach (CH); Knut Siercks, St. Gallen (CH)

(73) Assignee: Leica Geosystems AG, Heerbrugg (CH)

( * ) Notice: Subject to any disclaimer, the term of this patent is extended or adjusted under 35 U.S.C. 154(b) by 163 days.

(21) Appl. No.: 12/377,278

(22) PCT Filed: Aug. 16, 2007

(86) PCT No.: PCT/EP2007/007249
§ 371 (c)(1),
(2), (4) Date: Feb. 20, 2009

(87) PCT Pub. No.: WO2008/019856
PCT Pub. Date: Feb. 21, 2008

(65) Prior Publication Data
US 2010/0208318 A1 Aug. 19, 2010

(30) Foreign Application Priority Data
Aug. 18, 2006 (EP) .................................... 06119147

(51) Int. Cl.
*G02B 26/08* (2006.01)
(52) U.S. Cl. .................................................. 359/200.7
(58) Field of Classification Search ............... 359/200.7; 385/26
See application file for complete search history.

(56) References Cited

U.S. PATENT DOCUMENTS
5,039,193 A 8/1991 Snow et al.
(Continued)

FOREIGN PATENT DOCUMENTS
DE 295 18 708 U1 1/1996
(Continued)

OTHER PUBLICATIONS

Von Pfeil A et al: "Beam shaping of broad-area diode lasers: principles and Benefits" Proceedings of the SPIE—The International Society for Optical Engineering SPIE-Int. Soc. Opt. Eng USA, Bd. 4648, 2002, Seiten 82-90, XP002419031, ISSN: 0277-786X Inder Anmeldung Erwahnt das ganze dokumnet.

*Primary Examiner* — Euncha P Cherry
(74) *Attorney, Agent, or Firm* — Maschoff Gilmore & Israelsen

(57) ABSTRACT

A laser scanner for detecting spatial surroundings comprises a stator (21), a rotor (1), mounted on the stator (21) to be rotatable about a first rotational axis, and a rotary body (2), mounted on the rotor (1) to be rotatable about a second rotational axis. A laser source (6) and a detector (7) are arranged in the rotor (1). One optical link (9) each is configured on the second rotational axis on every side of the rotary body (2) between the rotor (1) and the rotary body (2) so that emission light can be introduced by the laser source into the rotary body (2) via the first optical link (8) and reception light can be discharge from the rotary body (2) via the second optical link (9). A first rotary drive (25) drives the rotor (21) and a second rotary drive (26) drives the rotary body (2). Two goniometers (4) and evaluation electronics (5) which are connected to the laser source (6) and the detector (7) allow association of a detected distance with a corresponding direction. The rotary body (2) can have a very compact design, is completely passive and therefore does not require any power supply or transmission of signals.

19 Claims, 4 Drawing Sheets

U.S. PATENT DOCUMENTS 5,157,745 A * 10/1992 Ames .................. 385/26
2005/0279914 A1   12/2005 Dimsdale et al.

FOREIGN PATENT DOCUMENTS

| | | |
|---|---|---|
| DE | 103 04 188 A1 | 8/2004 |
| EP | 0 035 054 A1 | 9/1981 |
| EP | 1 219 973 A2 | 7/2002 |
| EP | 1 241 486 A2 | 9/2002 |
| EP | 1 562 055 A2 | 8/2005 |
| GB | 2 163 617 A | 2/1986 |
| WO | 93/01465 A1 | 1/1993 |
| WO | 2004/109323 A2 | 12/2004 |

* cited by examiner

LASER SCANNER

The invention relates to a laser scanner according to the pre-characterising clause of Claim 1.

BACKGROUND

For detecting spatial surroundings, so-called 3D laser scanners are typically used. These are set up at a location and scan a 3D scenario starting from this location. Here, the measuring procedure requires rotations about two orthogonal axes, namely about a vertical axis and a horizontal axis rotating about the vertical axis. The rotation about the vertical axis is effected by the movement of the rotor around the stator, the second axis of rotation being present in the rotor.

In embodiments according to EP 1 562 055, the entire transmitting and receiving optical system is arranged in a fixed manner. A deflecting mirror which is mounted on the rotor so as to be rotatable about a horizontal axis is arranged perpendicularly above the transmitting and receiving optical system. The laser light is fed via the transmitting optical system onto the deflecting mirror. The potential uses of these embodiments are greatly limited owing to the limited detection range. What is also critical in the case of this design is the relatively large dimensions and the variability of the optical beam path via the adjustment of the mirror, which makes efficient suppression of scattered light from the collimated transmitted beam considerably more difficult. Since practically only non-cooperative surfaces having relatively poor reflectivity and strong scattering (low albedo) are surveyed over large distances in the surveying of arbitrary 3D scenarios, the adverse effect of scattered light should not be underestimated and rapidly reaches the order of magnitude of the signal to be measured.

A further disadvantage is the openness of the optical structure since the mirror must be freely moveable within the optical structure. Covering of the system for protection from dust and other environmental influences is therefore necessary on the one hand but on the other hand once again generates the described scattered light problem at the beam exit.

The document DE 295 18 708 U1 describes a theodolite having a telescope which is rotatable about a vertical axis and pivotable about a horizontal axis. The theodolite also comprises a laser distance-measuring apparatus, the laser beam for the distance measurement being introduced into the beam path of the telescope of the theodolite. For this purpose, the laser source is firmly connected in the tilt axis of the theodolite to the telescope and the laser beam is reflected into the sighting axis of the beam path of the telescope by at least one deflecting element. For determining the distance values, evaluation electronics are arranged on the telescope.

The evaluation electronics lead to an increase in the size of the telescope, the telescope for a 3D laser scanner itself requiring too much space and meaning additional mass. A further disadvantage of the evaluation electronics on the telescope is that the evaluation electronics must be connected via electrical supply cables and via signal lines through the pivot axis of the telescope. If the telescope is to be freely rotatable about the horizontal axis, the electrical supply of the laser source must be effected via a rotary lead-through. The known electrical rotary lead-throughs are complicated and susceptible to faults when the device is used under tough conditions.

SUMMARY

An object of the present invention is to provide an improved 3D laser scanner.

A further object is the provision of a 3D laser scanner having increased suitability for field work, in particular greater robustness and lower power consumption.

The inventive solution is based on the design of the laser scanner with an optical rotary body which has as simple and compact a design as possible, is moveable about two orthogonal axes and can be formed so as to be closed and without electrical rotary lead-throughs. The laser source, the laser detector and the evaluation electronics are housed outside the optical rotary body in a rotor which rotates about the substantially vertical axis.

Only a laser signal from the laser source in the rotor is introduced into the optical rotary body. Once again, the received laser light will be transmitted from the optical rotary body into the rotor, this transmission being effected via rotationally decoupled optical transmission elements which are coordinated with the components moved or rotated relative to one another. These two laser signals would preferably be transmitted on one side each of the optical rotary body, centrally along the axis of rotation of the rotary body. The transmitted and received light is thus coupled into the rotatable optical measuring head and coupled out therefrom via so-called optical connections or links. The measuring head is thus completely passive and requires no electrical power supply or signal transmission.

For a good distance-measuring apparatus, a transmitted laser beam having substantially rotationally symmetrical beam quality and high power is required. Laser sources which meet these requirements are complicated and expensive. Advantageous broad-area diode emitters can be efficiently coupled to rotationally symmetrical waveguides by means of a micro optical system, so that the line focus of the emitter is converted into an approximately square focus.

The laser light originating from the laser source is led in the rotor by a waveguide from the laser source to the optical link between rotor and rotary body. A multimodal fibre having a core diameter of, for example, 50 μm and a numerical aperture of, for example, 0.12 is suitable for this purpose. An economical and powerful broad-area diode laser can be efficiently coupled into such a fibre via a simple transmission optical system.

In the simplest form, the optical link consists of two fibre ferrules (fibre plugs) having an air gap of a few microns, in which one ferrule is mounted firmly in the rotary body and rotates with it and the other is held in the rotor, directly in the axis of rotation. If appropriate, an optical waveguide is arranged only on one side of the optical link. On introduction of the transmitted light into the rotary body, the entering light can, if appropriate, pass directly onto a deflecting element in the rotary body so that it is possible to dispense with an inner waveguide connecting to the optical link. On emergence of the received light from the rotary body, the emerging light can, if appropriate, pass directly onto the detector in the rotor so that it is possible to dispense with an outer waveguide connecting to the optical link.

The use of optical waveguides in the optical link is advantageous, for example, if they are designed in such a way that a variation of the angle of incidence of the light into the optical waveguide on the side of the rotary head has a negligible influence on the position of the beam axis at its fibre end. With such an optical design, it is possible to ensure that an eccentricity of the associated mechanical axis of rotation does not affect the position of the optical axis at this point.

If the optical link in the receiving channel is appropriately realised, the position of the optical axes from transmitted beam to received beam in the rotary head remains uninfluenced by an eccentricity of the corresponding axis of rotation.

Thus, this uncertainty need not be taken into account in the dimensioning of the opening angle of the receiving optical system and can finally be designed to be smaller. Thus, the received background light can be minimised, which in the end leads to an increase in the sensitivity and accuracy of the rangefinder.

In a preferred embodiment, a coating of the ferrule surfaces is used in order to increase the coupling efficiency and to suppress possible interfering etalon effects. If a larger air gap is required, for example owing to the tolerances in the rotational movement, the optical link can also be designed by means of two small collimation optical systems which likewise permit very good coupling efficiency.

After covering a short fibre distance in the measuring head, the transmitted light is led centrally out of the measuring head, for example via two mirrors and a simple collimation optical system. The receiving optical system comprises in particular also an optical system and two mirrors and is aligned with the same axis. Owing to the required larger receiving aperture, the receiving optical system uses in particular the outer region of the optical system.

With this design, it is possible to make the rotary body compact and small so that, for example, rotary bodies having a diameter of only 5 cm in the direction of the axis of rotation of the rotary body and having a height of only 4 cm perpendicular to the optical system can be realised. The laser light originating from the laser source passes via the mirrors and the central region of the optical system onto an object region. The back-scattered laser light passes through the radially outer region of the optical system and two mirrors into a waveguide which leads to the optical exit link between rotary body and rotor.

The receiving electronics can, if appropriate, be arranged directly at the exit link. Preferably, however, a waveguide leads from the exit link to the evaluation electronics. If the detector and the laser source are connected to the common evaluation electronics in the rotor, the distance measurement can be carried out efficiently.

BRIEF DESCRIPTION OF THE DRAWINGS

The drawings schematically illustrate the invention with reference to working examples.

DETAILED DESCRIPTION

Figure 1:
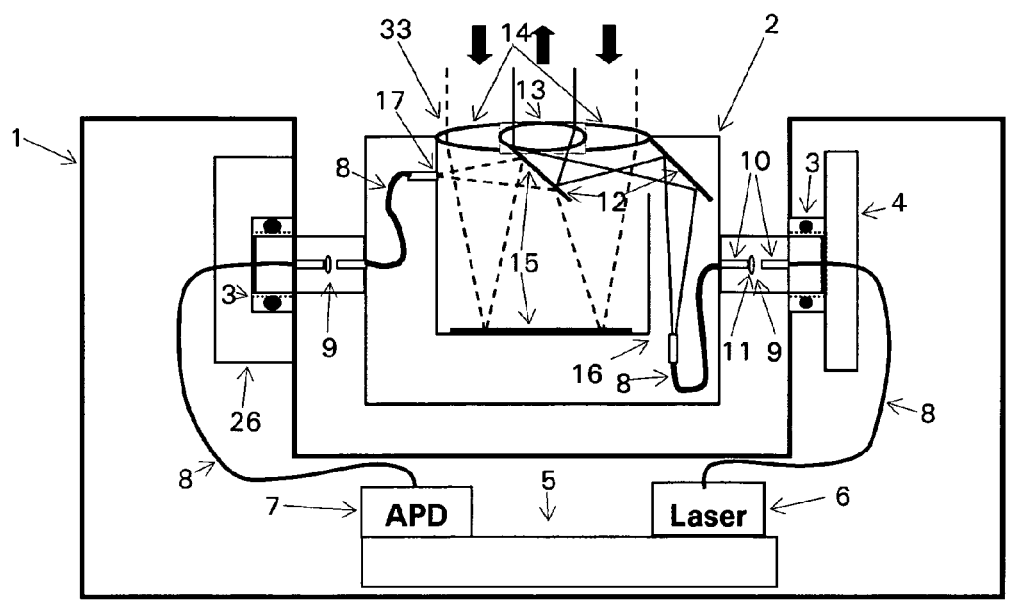
FIG. 1 shows a schematic vertical section through the rotor and the rotary body mounted therein.

FIG. 1 shows a rotor 1 on which a rotary body 2 is mounted on the rotary bearings 3 so as to be rotatable about a horizontal axis. The rotor 1 can be moved about a vertical axis by a first rotary drive which is not shown here, it being possible to determine the rotational position by a first angle-measuring device. By means of a second rotary drive 26, the rotary body 2 is caused to rotate. The rotational position of the rotary body 2 is detected by a second angle-measuring device 4. Evaluation electronics 5 in the rotor 1 are connected to a laser source 6 (laser) and a laser light detector 7 (APD) of the distance-measuring apparatus.

The laser light originating from the laser source 6 is fed in the rotor through a waveguide 8 from the laser source 6 to an optical link 9 between rotor 1 and rotary body 2. A multimodal fibre having a core diameter of, for example, 50 μm and a numerical aperture of, for example, 0.12 is suitable for this purpose.

The optical link 9 comprises two fibre ferrules 10 (fibre plugs) and an air gap of a few microns, one ferrule being firmly mounted as a first optical transmission element in the rotary body 2 and rotating with it and the other ferrule being held as a second optical transmission element in the rotor 1, directly in the axis of rotation. Thus, first and second optical transmission elements are rotationally decoupled from one another, i.e. are freely rotatable relative to one another, and are coordinated in each case with rotary body 2 and rotor 1. In the embodiment shown, the optical link 9 also comprises a lens 11 for optimum transmission of the laser light.

As an alternative to fibre ferrules and fibre plugs, it is also possible to use fibre-coupled collimators or fibre collimators which collimate the divergent radiation at the fibre end for transmission or coupling again into a fibre.

Instead of an air gap, however, it is also possible to use liquid-filled connections between the optical transmission elements, for example a gap filled with an index-adapted medium. Such a medium is available, for example, in the form of index-matching oil and permits the suppression of back-reflections.

In the rotary body 2, a waveguide 8 feeds the transmitted light to an exit point 16, from which it emerges via two first mirrors 12 and a central lens 13 out of the rotary body 2. The two first mirrors 12 are arranged in the rotary body 2 at a passage boundary 33. The transmitted light is guided between the two first mirrors 12 from a lateral region to the central lens 13.

The laser light scattered back by the object region passes through an annular lens 14 and two second mirrors 15 to an entry point 17 of a waveguide 8. By an optical link 9 and the connected waveguide 8, the received light passes to the detector 7. The evaluation electronics determines, from signals of the laser source 6 and of the detector 7, distance values which are coordinated with the corresponding rotational orientation of the second angle-measuring device 4. The orientation of the rotor 1 relative to a stator is detected by a first angle-measuring device which is not shown. Each detected distance value can be coordinated with a spatial orientation determined by two orientation values.

In the embodiment of the rotary body which is shown, different focal distances are provided for the transmitting and receiving optical systems. The transmitting optical system having a focal distance of 50 mm requires an exit pupil of 12 mm diameter. The optical system may be a multilens system or may consist of an (aspherical) single lens. The receiving optical system, having a focal distance of 80 mm and a diameter of 30 mm, is designed substantially larger and holds the transmitting optical system in the central region. A bore through the receiving lens with the transmitting optical system as an insert or a complex glass moulding having two different focal distance ranges or the combination of the receiving optical system with a diffractive element in the central region in order to achieve a higher refractive power here is suitable for this purpose.

Figure 3:
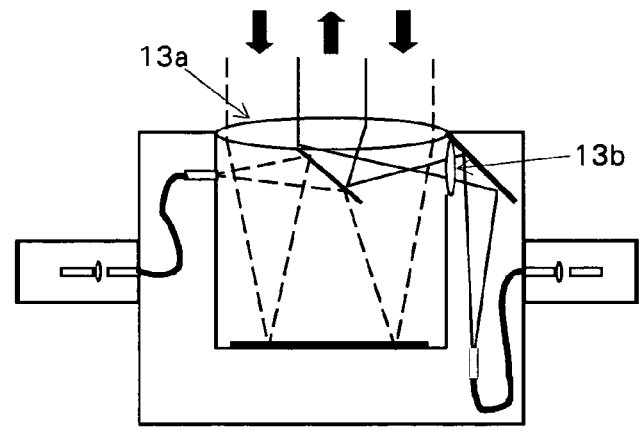
FIG. 3 shows a schematic vertical section through the rotary body.

Also realisable is a design of the optical system as shown in FIG. 3, in which the same front lens 13a is used for receiving and transmitting optical system, in combination with a further lens element 13b in the transmission channel, which gives the desired shortened focal distance.

Since the properties of the optical system are greatly dependent on the transmitting power, the core diameters of the fibres, the maximum distance to be measured, the albedo of the target and the sensitivity of the detector and the measuring principle in general, other embodiments of the optical system can be derived by the person skilled in the art.

The received light is mapped via a folded beam path, consisting of two second mirrors 15, onto a waveguide 8 having a core diameter of 200 μm. The second mirrors 15 may also be curved in order to make the design even more compact. The received light is guided in the rotor 1 onto a detector 7 via an optical link 9 which is formed similarly to the transmission channel. All electronics components can therefore be kept outside the rotary body 2.

Within the rotary body 2, there is no overlap of the beam paths for transmission and reception channel, which substantially reduces the risk of scattered light. The entire optical setup is encapsulated in the rotary body 2 and is therefore optimally protected from environmental influences. An outer cover is not required. Independently of the angle of rotation, the transmitting and receiving optical system always have the same orientation relative to one another, in contrast to embodiments to date, in which the mirror is permanently moved relative to the remainder of the optical system, which leads to constantly changing mapping situations and is relatively susceptible to adjustment or errors.

Figure 2:
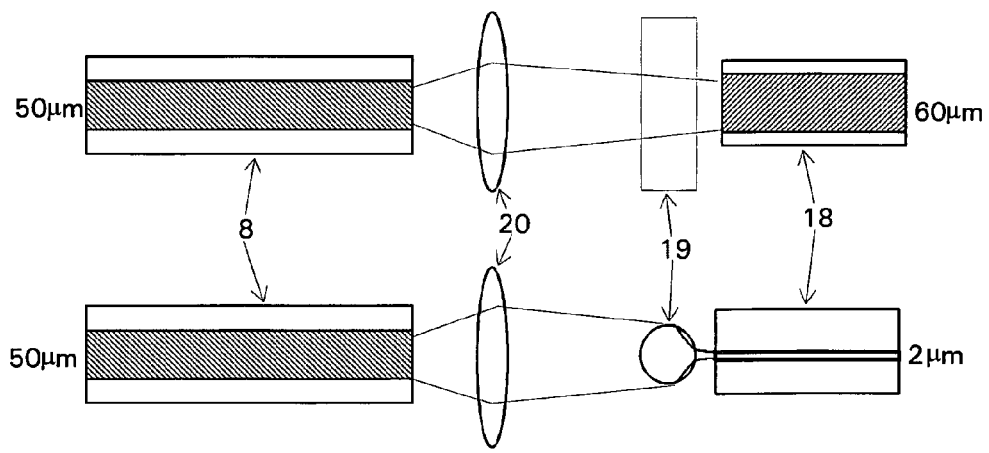
FIG. 2 shows two schematic longitudinal sections through a broad-area diode emitter, a micro optical system and a rotationally symmetrical waveguide.

FIG. 2 shows a laser source 6 in the form of a broad-area diode emitter 18 having dimensions of 60 μm wide (slow axis) and 2 μm narrow (fast axis). The laser light of this emitter is coupled by means of a micro optical system into the rotationally symmetrical waveguide 8 having a diameter of 50 μm. The micro optical system of the working example comprises a cylindrical lens 19 and a spherical lens 20, the line focus of the emitter 18 being converted into an approximately square focus. The prior art, for example A. von Pfeil, *"Beam shaping of broad area diode laser: principles and benefits"*, Proc. SPIE Vol. 4648, Test and Measurement Applications of Optoelectronic Devices, discloses segmenting beam conversion optical systems. These new optical systems can stack a line focus section by section to give a square focus.

Figure 4:
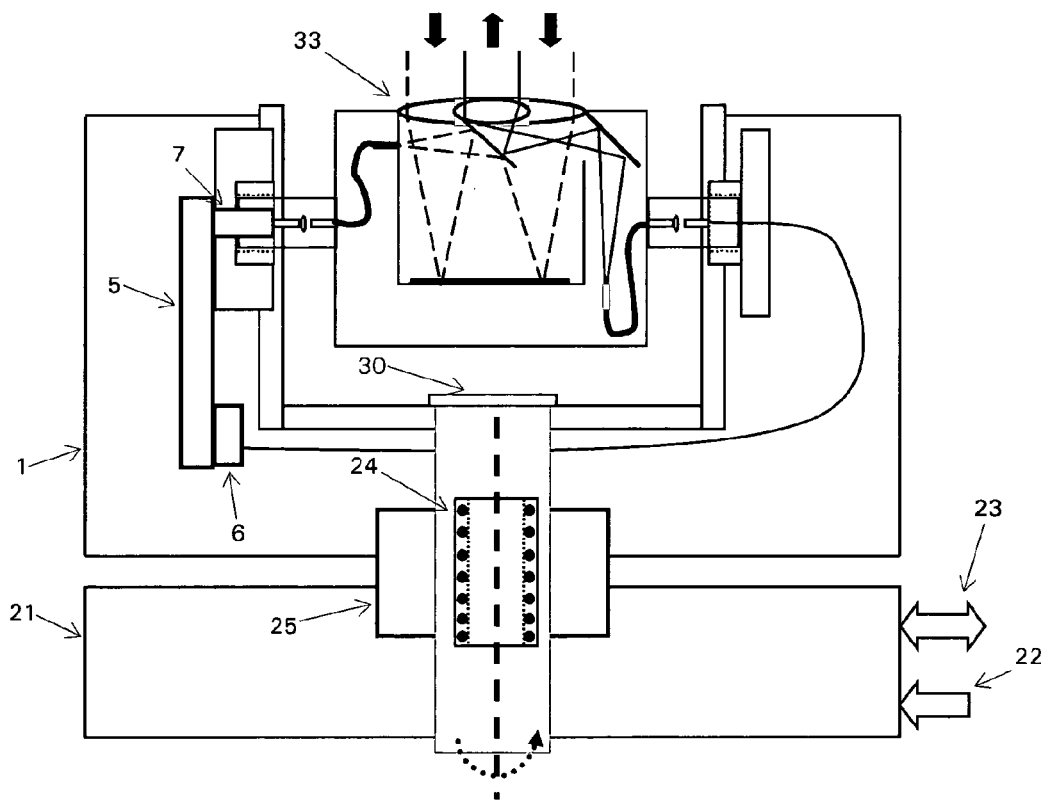
FIG. 4 shows a schematic vertical section through an embodiment according to FIG. 1 with a stator.
Figure 5:
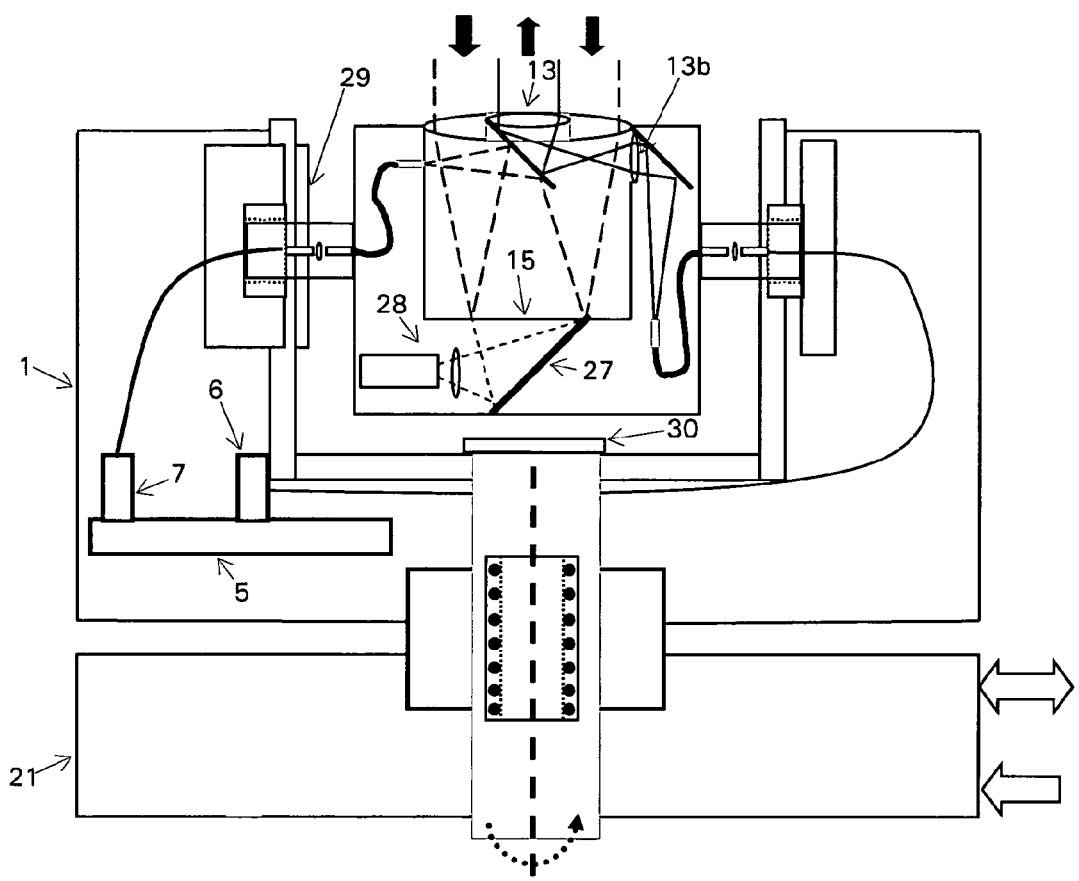
FIG. 5 shows a schematic vertical section of an embodiment with a camera and FIG. 6 shows a schematic vertical section of an embodiment with a pumped solid-state laser.

Further embodiments are to be found in FIGS. 4 and 5. The total system with the mounting of the rotor 1 on a stator 21 is also shown there, as well as an electrical supply 22 and a communication interface 23. A bearing 24 is provided for rotary mounting of the rotor 1 on the stator 21. The rotor 1 is caused to rotate by a first rotary drive 25.

A laser scanner according to the invention therefore comprises the stator 21, the rotor 1 mounted on the stator 21 so as to be rotatable about a first axis of rotation, the rotary body 2 mounted on the rotor 1 so as to be rotatable about a second axis of rotation, the evaluation electronics 5, the laser source 6 and the laser light detector 7. For the passage of transmitted light and received light, the rotary body 2 comprises a passage boundary 33 parallel to the second axis of rotation.

A desired scanning movement is effected by appropriate control of the first rotary drive 25 and of the second rotary drive 26. The spatial orientation of the rotary body 2 is detected via the two angle-measuring devices 4. By connecting the evaluation electronics 5 to the laser source 6, the detector 7 and the angle-measuring devices 4, a detected distance can be coordinated with a corresponding orientation.

In the embodiment according to FIG. 4, the detector 7 is arranged directly at the optical link 9. This makes it possible to dispense with a waveguide for transmitting the received light from the optical link 9 to the detector.

In the embodiment according to FIG. 5, the rear second mirror 15 of the receiving optical system is partly transparent. Behind this partly transparent second mirror 15, a deflecting mirror 27 and a compact CCD camera 28 can be installed in the rotary body 2. The camera 28 permits optical checking of the reception channel. In order to be able to operate the camera 28 in the rotary body 2, a rotary lead-through 29 for the camera 28 is used. The camera 28 can, however, also be supplied with power optically by coupling light of another wavelength from a separate source (100 mW) into the fibre or laser source 6 and the link 9 via a chromatic beam splitter and coupling it out again in the rotary body via an identical beam splitter and guiding it onto a photovoltaic component or solar cell, which provides the necessary camera supply. The data transmission can be effected optically via a modulated signal, once again also by means of a beam splitter via output fibres. Corresponding weak-current components are known, for example, from mobile radio technology and are available. With the aid of the camera, the texture of the object to be scanned can be detected. As an alternative or in addition to the camera, it is also possible to use a simple spectral sensor. If it is intended rapidly to detect beforehand the entire scenery to be scanned, a camera arranged in the rotor (1) to the side of the rotor body (2) and having appropriate zoom optics can also be realised.

Below the rotary body 2, a reference unit 30 similar to the embodiment in DE 102 16 405 can be installed on the rotor 1, in order to permit complete calibration of the distance-measuring apparatus. In the simplest case, the reference unit 30 consists of a target at a known distance in order to obtain a distance normal on rotation of the measuring head. In addition, the reflectivity of the target may vary in order to permit a dynamic distance calibration.

Figure 6:
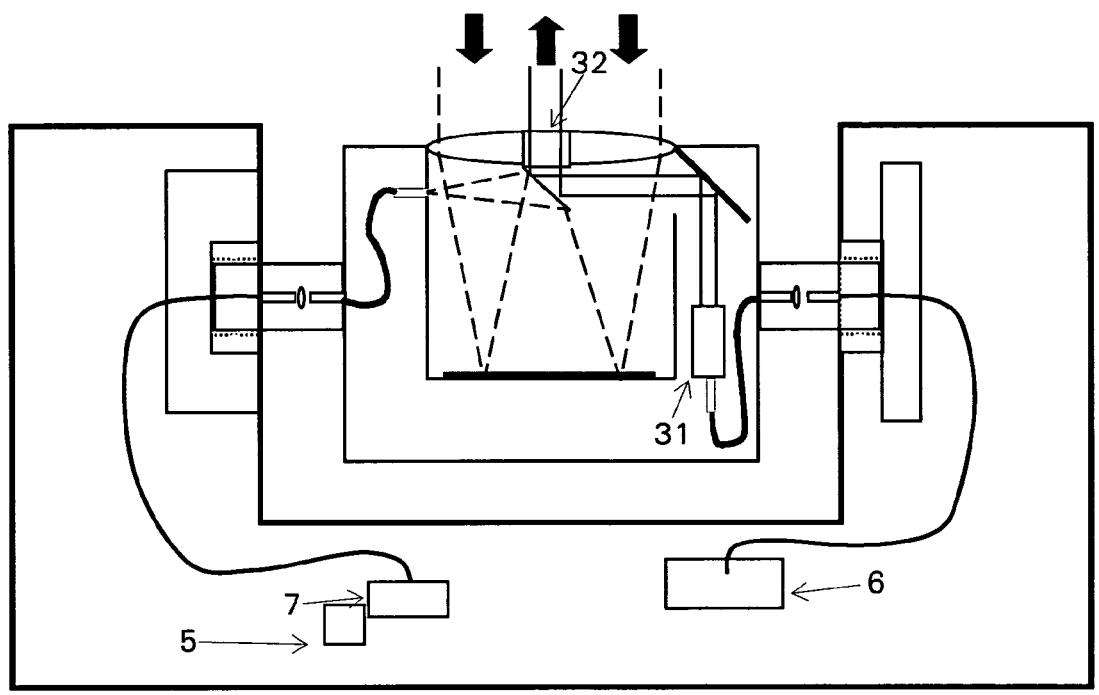

In the embodiment according to FIG. 6, a variant comprising a diode-pumped solid-state laser 31 is shown. The solid-state laser 31 is, for example, a μ-chip laser (Nd:YAG) Q-switched with a saturable absorber ($Cr^{4+}$:YAG). Owing to the high peak powers in the kW range, fibre transmission is critical owing to the destruction threshold. In the embodiment shown, the pumped light of the pumped laser 6 (808 nm) can be fed via the optical link 9 into the rotary body 2 and excites the solid-state laser 31 there. The emerging laser light need not be passed through a lens but can emerge from the rotary body 2 through an exit hole 32.

Of course, all features described can be used by the person skilled in the art in combination in order to derive further working examples in the context of the present invention. In particular, the stated sizes relate to possible forms to be realised and are therefore not to be understood as being limiting.

If, in a special embodiment, a compact design of the rotary body 2 can be dispensed with, any desired other beam path, for example with transmitted beam path and received beam path side by side, can be provided instead of the folded beam path described.

What is claimed is:

1. A laser scanner comprising:
    a stator;
    a rotor mounted on the stator so as to be rotatable about a first axis of rotation;
    a rotary body mounted on the rotor so as to be rotatable about a second axis of rotation and having a passage boundary parallel to the second axis of rotation for the passage of transmitted light and received light;
    evaluation electronics;
    a laser source;
    a laser light detector,
    a first rotary drive making the rotor driveable; and a second rotary drive making the rotary body driveable, the spatial orientation of the rotary body being detectable via two angle-measuring devices and the evaluation electronics being connected to the laser source, the detector and the angle-measuring devices being configured in order to coordinate a detected distance with a corresponding orientation, wherein the laser source and the detector are arranged in the rotor and one optical link each having in each case first and second optical transmission elements rotationally decoupled from one another is formed between rotor and rotary body on the second axis of rotation on both sides of the rotary body, the rotary body being configured to couple transmitted light into the rotary body via the first optical link and to couple received light out of the rotary body via the second optical link, and the first optical transmission element being coordinated with the rotary body and the second optical transmission element being coordinated with the rotor.

2. A laser scanner according to claim 1, wherein the first and/or second optical link has two fibre ferrules as first and second optical transmission elements, a first ferrule being firmly mounted in the rotary body and rotating with it and the other ferrule being held in the rotor in the axis of rotation.

3. A laser scanner according to claim 1, wherein the first and/or second optical link has fibre-coupled collimators as first and second optical transmission elements.

4. A laser scanner according to claim 1, wherein a medium adapted to the refractive index of the transmission elements and intended for suppressing back-reflections is arranged between first and second optical transmission elements.

5. A laser scanner according to claim 1, wherein the laser source is connected to the first optical link via a waveguide.

6. A laser scanner according to claim 5, wherein the first optical link is formed in such a way that a change in an angle of incidence at an entrance of the first optical link produces no change in an angle of emergence at an exit of the first optical link.

7. A laser scanner according to claim 1, wherein one waveguide each connects to both optical links in the rotary body, the waveguides guiding transmitted light from the first optical link to an exit point and received light from an entry point to the second optical link.

8. A laser scanner according to claim 1, wherein two first mirrors and a central passage region in the passage boundary are used for guiding the transmitted light, the two first mirrors being arranged in the rotary body at the passage boundary and the transmitted light being passed between the two first mirrors from a lateral region to the central passage region.

9. A laser scanner according to claim 1, wherein the central passage region is formed by a central lens or an exit hole.

10. A laser scanner according to claim 1, wherein two second mirrors and an annular lens region are formed for guiding the received light, the annular lens region extending around the central passage region, one second mirror being opposite the passage boundary and one being at the back of a first mirror in the central region.

11. A laser scanner according to claim 1, wherein the focal distances of the transmitting and receiving optical systems are different.

12. A laser scanner according to claim 11, wherein the transmitting optical system has a focal distance of substantially 50 mm and an exit pupil of substantially 12 mm diameter and the receiving optical system has a focal distance of substantially 80 mm and a diameter of substantially 30 mm.

13. A laser scanner according to claim 1, wherein a broad-area diode transmitter is used as the laser source and is coupled by means of a micro optical system to the waveguide, the line focus of the emitter being converted by the micro optical system into an approximately square focus.

14. A laser scanner according to claim 13, wherein the light of the broad-area emitter can be fed in the rotary body to a pumpable solid-state laser, in particular a saturable absorber or a Q-switched microchip laser, and the laser light of the solid-state laser is to be used as transmitted light.

15. A laser scanner according to claim 1, wherein a reference surface whose position with rotating rotor body is periodically detectable as a reference is formed on the rotor.

16. A laser scanner according to claim 1, wherein the rotary body includes a camera.

17. A laser scanner according to claim 16, wherein the rear second mirror of the receiving optical system is partly transparent and a deflecting mirror and a compact CCD camera are used behind it in the rotary body.

18. Laser scanner according to claim 17, wherein a power supply of the camera is in the form of an optical connection with a down-circuit photovoltaic component.

19. Laser scanner according to claim 17, wherein a power supply of the camera is in the form of an optical connection with a down-circuit photovoltaic component with coupling in and coupling out of light of a further laser source via chromatic beam splitters.

* * * * *